(12) United States Patent
Message et al.

(10) Patent No.: US 6,227,710 B1
(45) Date of Patent: *May 8, 2001

(54) ROLLING BEARING WITH INFORMATION SENSOR

(75) Inventors: Olivier Message, Tours; Franck Landrieve, Fondettes, both of (FR)

(73) Assignee: SKF France, Clamart Cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/067,901

(22) Filed: Apr. 29, 1998

(30) Foreign Application Priority Data

Apr. 29, 1997 (FR) .................................. 97 05284

(51) Int. Cl.[7] ...................................... F16C 33/30
(52) U.S. Cl. ............................................. 384/448
(58) Field of Search .................... 384/448, 446, 384/544, 589, 445

(56) References Cited

U.S. PATENT DOCUMENTS 4,875,785 * 10/1989 Santos et al. ........................ 384/448

FOREIGN PATENT DOCUMENTS

| 0320322A | 6/1989 | (EP) . |
| 0495323A | 7/1992 | (EP) . |
| 0511105A | 10/1992 | (EP) . |
| 0631139A | 12/1994 | (EP) . |

* cited by examiner

*Primary Examiner*—Lenard A. Footland
(74) *Attorney, Agent, or Firm*—Smith, Gambrell & Russell (57) ABSTRACT

Rolling bearing comprising a stationary race 1, a rotating race 4, at least one row of rolling elements 3 placed between the stationary race 1 and the rotating race 4, an encoder 11 which is concentric with and is secured to the rotating race 4, and a sensor 14. A support 16 secures the sensor to the stationary race 1. The sensor faces and is a small gap 15 away from the encoder 11, the rotational travel of which is detected by the sensor 14. The sensor 14 bears directly on a reference surface 9*b* of the stationary race 1.

47 Claims, 6 Drawing Sheets

ROLLING BEARING WITH INFORMATION SENSOR

The present invention relates to the field of rolling bearings with information sensors of the kind possessing a stationary race and a rotating race, one or more rows of rotating elements in contact with raceways formed on the said races, a sensor assembly secured to the stationary race and an encoder means secured to the rotating race and rotating past the sensor with a radial gap.

This type of rolling bearing is used in numerous applications where it is necessary to have accurate information about the angular displacement parameters of a mechanical element, especially the speed or angular position. These rolling bearings can be used for example in electric motors, robots or in numerous rotating members.

One of the problems to be solved in this type of instrumented rolling bearing is the accuracy obtained with regard to the value of the radial gap between the sensor and the encoder, the quality and reliability of the signal obtained depending on this parameter. The accuracy in the value of the gap depends in particular on the concentricity of the races of the rolling bearing, on the concentricity of the encoder with respect to the rotating race and on the radial position of the sensor with respect to a reference surface of the non-rotating race. The concentricity of the races of the rolling bearing is achieved by construction, a rolling bearing being a precision mechanical member. The concentricity of the encoder with respect to the rotating race of the rolling bearing poses no particular problem insofar as the annular encoder can be push-fitted onto a precision-ground land of the rotating race. The radial position of the sensor with respect to a reference surface of the non-rotating race of the bearing, therefore remains the determining parameter with regard to the final accuracy in the value of the gap.

In conventional systems, the electronic component constituting the sensor is fixed in a support, generally made of a synthetic material, so as thus to form a sensor block which is itself positioned on the non-rotating race of the instrumented rolling bearing. It follows that the accuracy of the gap between the sensor and the encoder will depend largely on the accuracy with which the sensor can be positioned radially with respect to its support and with which the support can be positioned radially with respect to a reference surface of the non-rotating race of the rolling bearing. This results, on the one hand, in a relatively high manufacturing cost and, on the other hand, in additional risks regarding the scatter in the final value of the resulting gap between the sensor and the encoder.

The object of the invention is to overcome the drawbacks of the above devices and to propose a rolling bearing which makes it possible to circumvent the problem of the radial positioning of the sensor with respect to its support.

The rolling bearing, according to the invention, comprises a stationary race, a rotating race, at least one row of rolling elements placed between the stationary race and the rotating race, an encoder means secured to the rotating race and concentric therewith and a sensor assembly which includes a sensor and a support for the sensor. The sensor is secured to the stationary race and arranged facing and a small gap away from the encoder means the travel of which, during rotation, is detected by the which bears directly on a reference surface of the stationary race.

The scatter in the value of the gap, due to the positioning of the sensor with respect to its support and of the support with respect to the stationary race, is thus eliminated.

Advantageously, there is provision for the support to exert a continuous load on the sensor in the direction of the reference surface. This load precludes any inopportune displacement of the sensor.

In one embodiment of the invention, the sensor comprises at least one magnetosensitive sensor, for example a Hall effect sensor, or optical sensor and the encoder means comprises a multipole magnetized ring.

In one embodiment of the invention, the sensor assembly includes at least one of which, each sensor is provided with a housing comprising a reference face in contact with the said reference surface of the stationary race, and a detection face opposite the reference face and arranged facing the encoder means.

Preferably, the housing comprises two chamfer-forming oblique surfaces linking up with each side of the detection face. The sensor support can be annular and provided with at least one recess designed to accommodate a sensor, each recess comprising a notch whose edges form surfaces for positioning the sensor with respect to the support. Advantageously, the edges of the recess are arranged converging towards the inside of the bearing, and in contact with the oblique surfaces of the housing.

In one embodiment of the invention, the support comprises at least one drilling for connection pins of the sensor.

Advantageously, the support comprises an annular main body and an annular retaining element, the main body being in contact with the front end face of the extension and the retaining element being in contact with the bore of the said extension.

In one embodiment of the invention, the reference face of the housing projects radially with respect to the periphery of the support.

In one embodiment of the invention, the support is provided with two axial grooves capable of co-operating with complementary surfaces of the stationary race.

In this way one or more sensors are obtained whose spatial position is determined directly by their contact with the reference surface of the stationary race, thus considerably reducing the possibilities of scatter in the value of the gap between the sensor and the encoder.

The invention will be better understood on studying the detailed description of a few embodiments taken by way of non-limiting examples and illustrated by the appended drawings, in which.

As may be seen in the figures, the rolling bearing comprises an outer race 1 comprising on its bore a raceway 2 for rolling elements 3, for example balls, and an inner race 4 provided with a raceway 5 for the rolling elements 3. The rolling elements 3 are held circumferencially spaced by a cage 6. A seal 7 is provided on one of the sides of the rolling bearing and is secured to the outer race I by means of a groove 8 arranged axially between the raceway 2 and a radial face of the outer race 1.

On the side opposite to the seal 7, the outer race 1 comprises an axial extension 9 whose periphery 9a is of smaller diameter than that of the periphery of the outer race 1 and whose bore 9b is greater than the bore of the outer race 1. The axial extension 9 terminates in a radial front surface 9c. The inner race 4 also comprises an axial extension 10 arranged on the same side as the axial extension 9, of bore identical to that of the inner race 4 and provided with a precision-ground land 10a on its outer surface.

An encoder 11 is provided with an active part 12 made for example from a synthetic material laden with magnetic particles, and with a sheet metal support 13 on which the active part 12 is overmoulded and comprising a push-fit cylindrical part 13a and a radial rim 13b. The active part 12 comprises a cylindrical outer surface 12a.

A sensor 14 is mounted, secured to the outer race 1, opposite and a small distance away from the cylindrical surface 12a of the active part 12 of the encoder 11 so as to define a radial gap 15. The sensor assembly includes the sensor 14 and a support 16 comprising a connection outlet 17 in which is mounted a cable 18 enabling the information from the sensor to be communicated to the members intended to receive it.

The sensor support 16 is surrounded by a cover 19 of sheet metal, provided with a cylindrical portion 20 one end of which is push-fitted onto the periphery 9a of the extension 9 of the outer race 1, and with a radial portion 21 furnished with a drilling 22 allowing through the connection outlet 17. The free end of the radial portion 22 supports a seal 23 which comes into frictional contact with the cylindrical land 10a of the extension 10 of the inner race 4. Together with the outer race 1 and inner race 4 and the rolling elements 3, the cover 19 defines an enclosed space, protected from outside pollution, in which the encoder 11 and the sensor 14 are placed.

The sensor support 16 comprises a main body 24 arranged axially between the radial portion 21 of the cover 19 and the front surface 9c of the extension 9, and a retaining element 25 arranged axially between the main body 24 and the rolling elements 3, around the encoder 11. The main body 24 and the retaining element 25 are annular, except that the retaining element 25 is provided with an accommodating recess 26 for a sensor 14. The recess 26 is provided with oblique edges 27.

Figure 1:
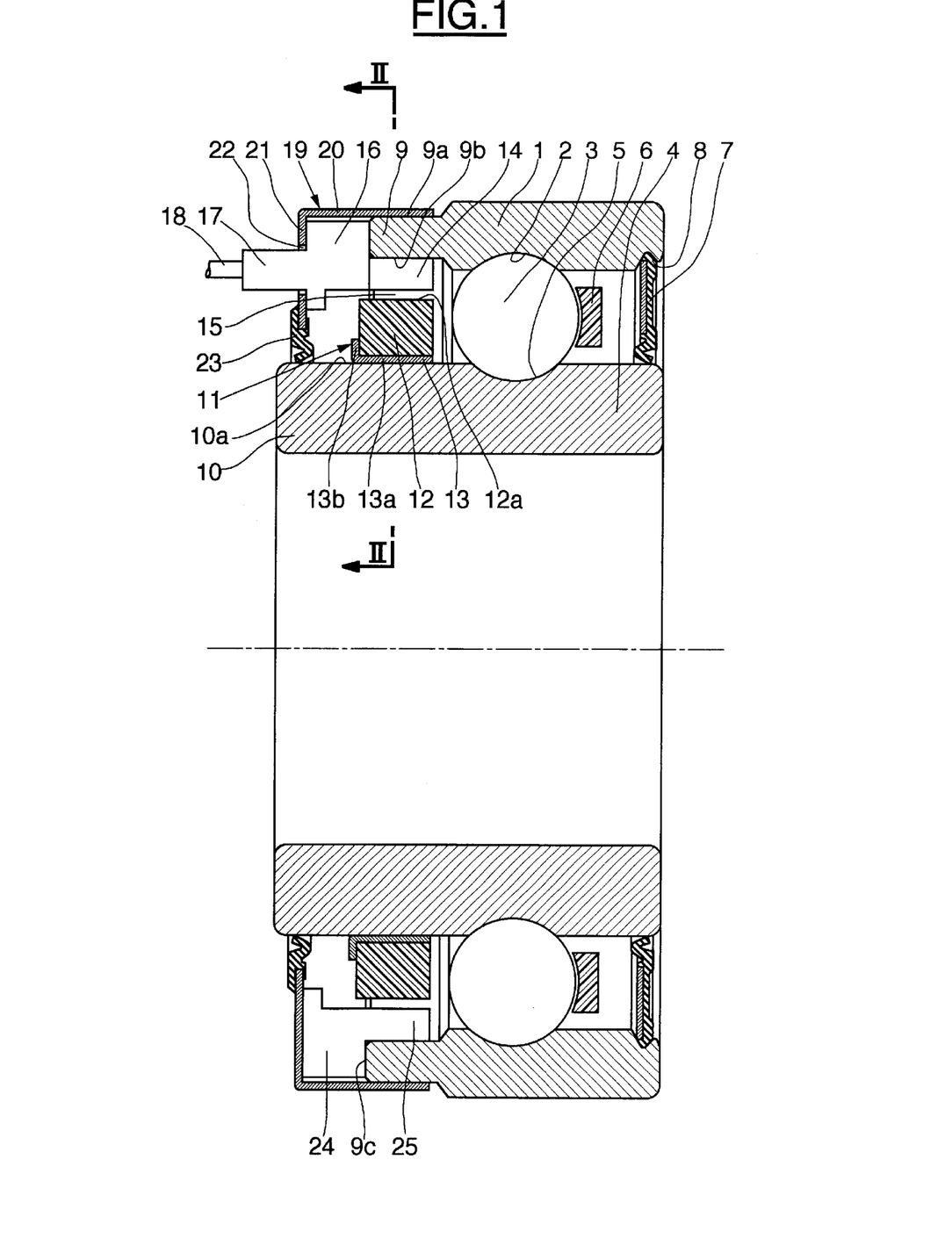
FIG. 1 is an axial sectional view of a rolling bearing according to the invention.
Figure 2:
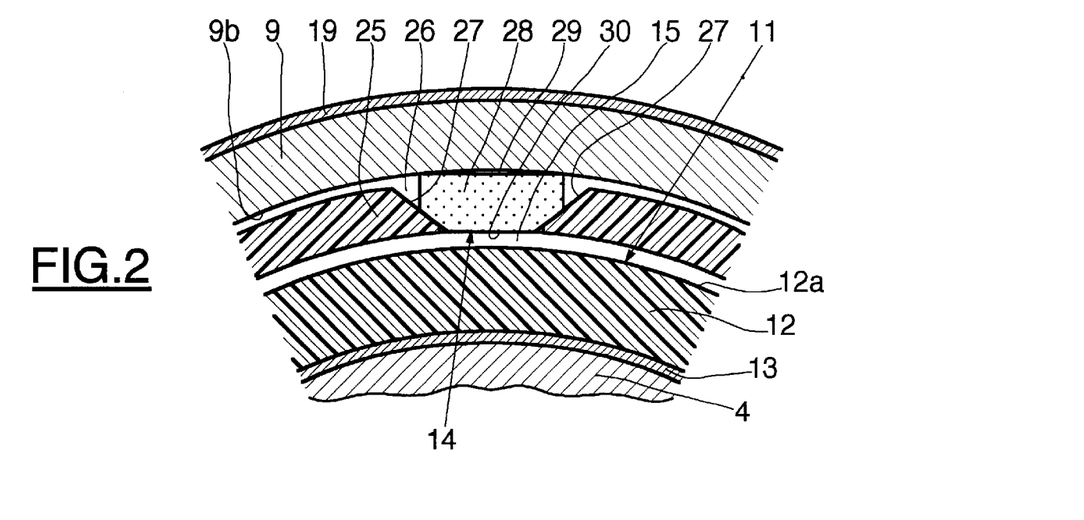
FIG. 2 is a sectional view along II—II of FIG. 1.
Figure 3:
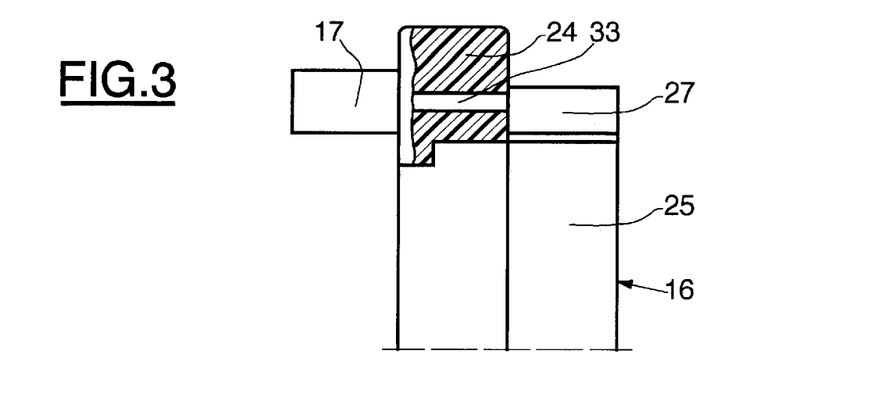
FIG. 3 is a side elevational view of a sensor support.
Figure 4:
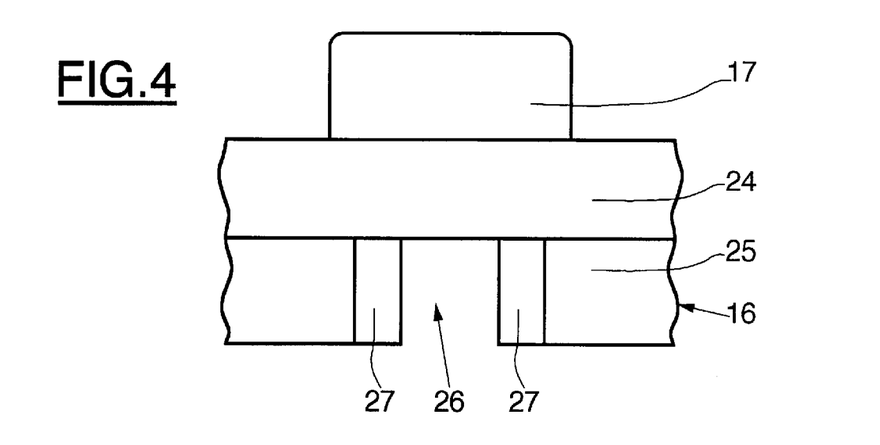
FIG. 4 is a plan elevational view corresponding to FIG. 3.
Figure 5:
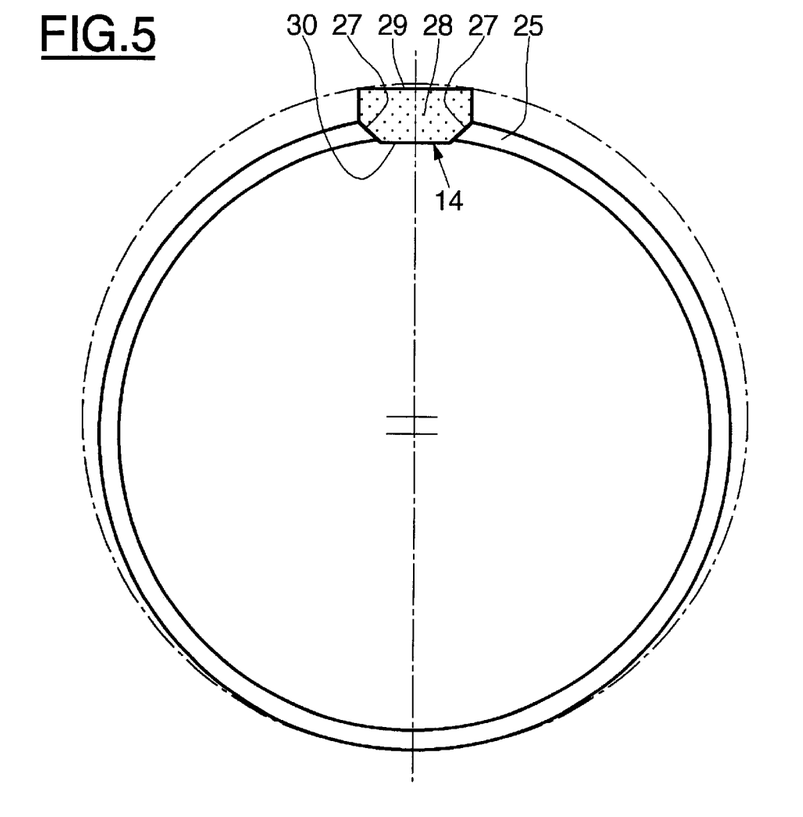
FIG. 5 is a front elevational view of a sensor support equipped with a sensor.
Figure 6:
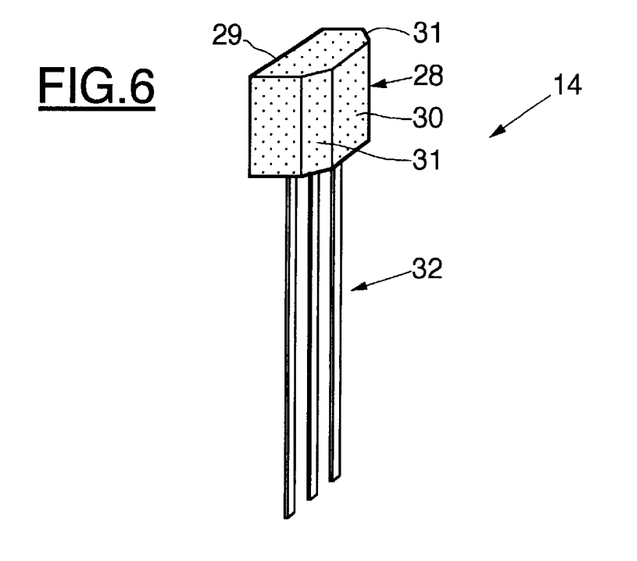
FIG. 6 is a perspective view of a sensor.
Figure 7:
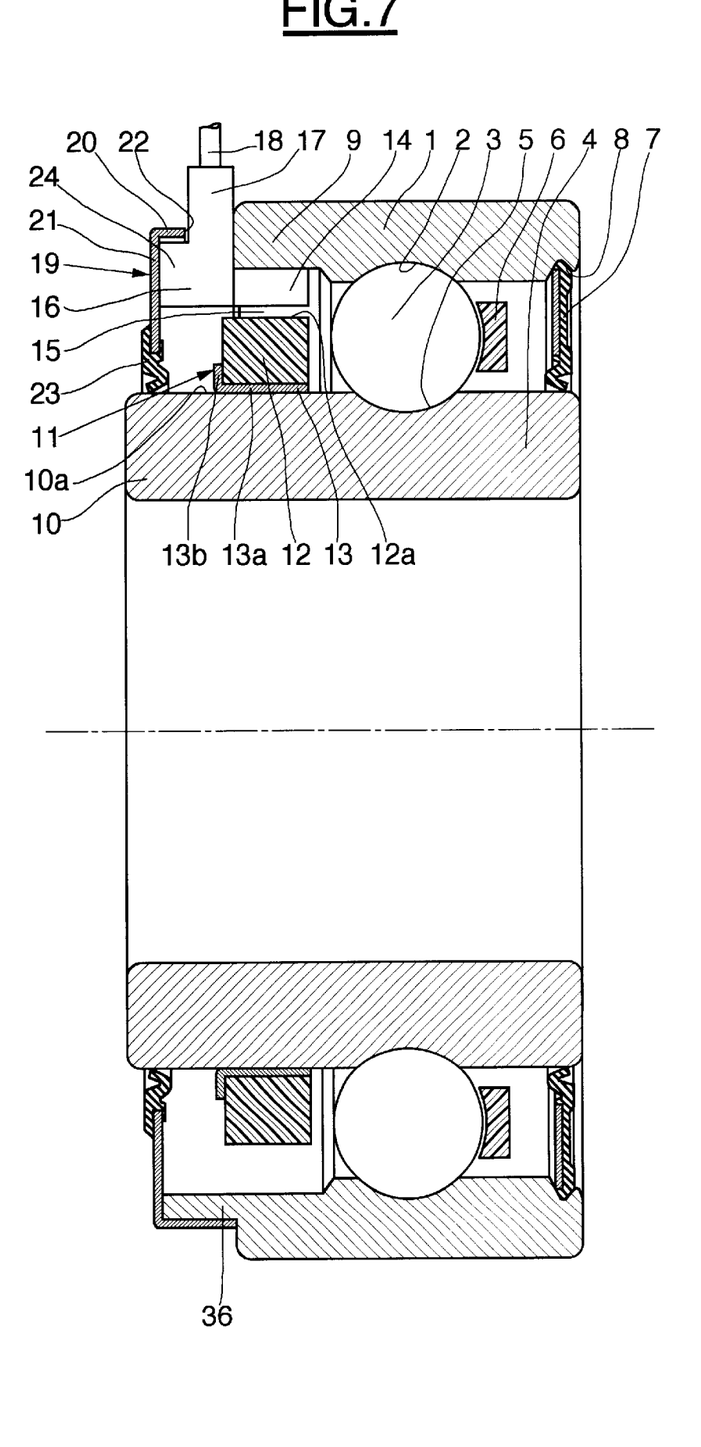
FIG. 7 is an axial sectional view of a rolling bearing according to another embodiment of the invention.
Figure 8:
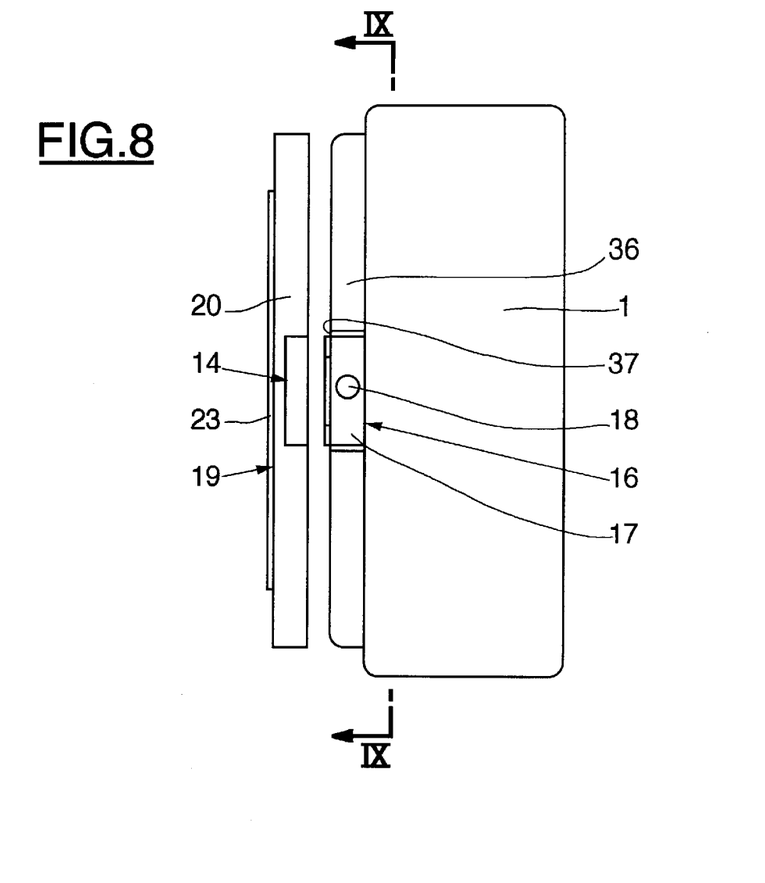
FIG. 8 is a plan elevational view of a rolling bearing according to another embodiment of the invention.
Figure 9:
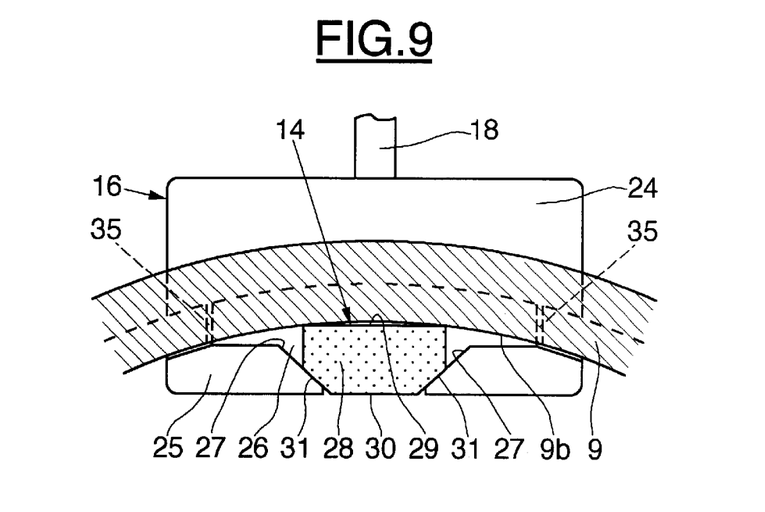
FIG. 9 is a sectional view along IX—IX of FIG. 8.
Figure 10:
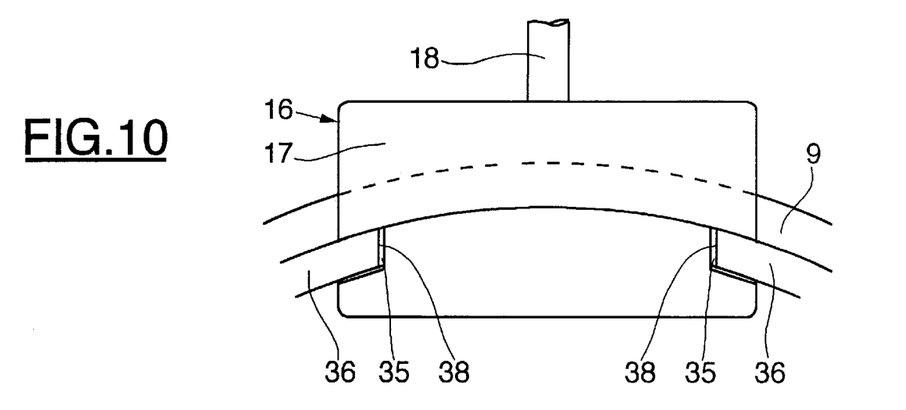
FIG. 10 is a partial front elevational view of the rolling bearing of FIG. 8.
Figure 11:
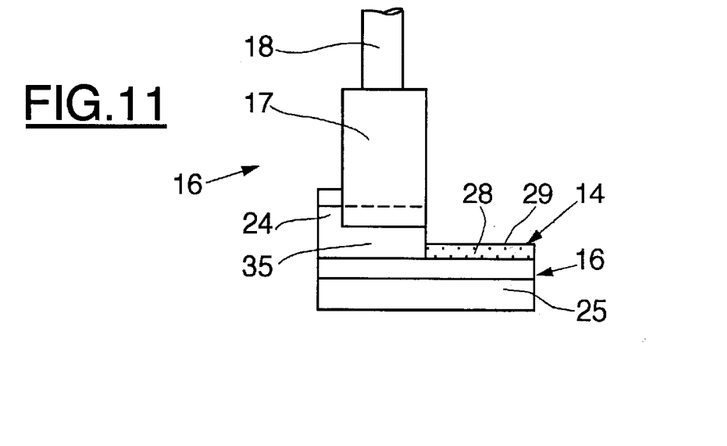
FIG. 11 is a side elevational view of a sensor support.
Figure 12:
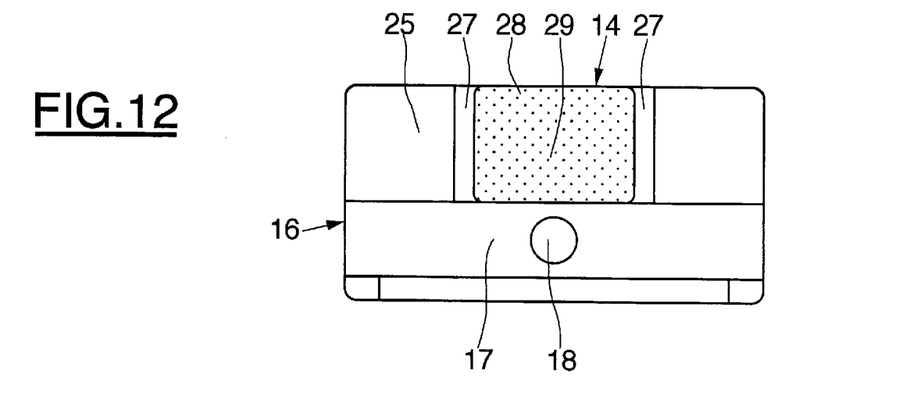
FIG. 12 is a plan elevational view of the sensor support of FIG. 11.

As may be seen more particularly in FIG. 6, the sensor 14 takes the form of a component possessing a housing 28 provided with a reference face 29, a detection face 30 opposite the reference face 29, two chamfers 31 arranged on either side of the detection face 30, and pins 32 emanating from another face of the housing 28. The sensor 14 is arranged on the support 16 via an axial movement. Pins 32 are threaded into a passage 33 (FIG. 3) provided for this purpose and passing through the main body 24. At the conclusion of the axial movement, the housing 28 will be arranged in the recess 26, the chamfers 31 of the detection face 30 co-operating with the oblique surfaces 27, until the housing 28 is wedged against the main body 24. The sensor is then secured with the support in this position, for example by means of a resin introduced into the connection outlet region 17. The housing 28 is then in the position illustrated in FIGS. 2 and 5. The reference face 29 of the housing 28 is oriented outwards so as to come into contact via its edges with the bore 9b of the extension 9 which serves as reference surface.

To guarantee contact between the housing 28 and the bore 9b of the extension 9, there is provision for the reference face 29 to project slightly radially outwards with respect to the periphery of the retaining element 25. The support 16 is made from a material exhibiting a degree of flexibility. The support 16 is designed so that it can be inserted into the bore 9b with very slight play only. Thus, provision may be made for the circle circumscribing the retaining element 25 and housing 28 assembly to have a diameter slightly greater than the bore 9b of the extension 9 (FIG. 5). Thus, after mounting the support 16 on the outer race 1, the said support will exert, through elasticity, a radial load on the housing 28 via the oblique surfaces 27 of the retaining element 25, the said radial load keeping the housing 28 continually bearing against the reference bore 9b. The sensor 14 is thus placed directly in contact with a reference surface of the outer race 1, the radial distance of which with respect to the encoder is accurate and controlled.

In the embodiment illustrated in FIGS. 7 to 12, the support 16 is of the type with slideway, comprising two axial grooves 35 provided in the main body 24, on each edge of the latter and radially in the vicinity of the outer surface of the retaining element 25. The outer race 1 is provided with an additional axial expanse stretching beyond the extension 9. The additional expanse 36 is annular, interrupted only by a notch 37 provided with parallel edges 38 which will co-operate with the grooves 35 of the support 16. The support 16 and the outer race 1 are thereby secured. Here the connection outlet 17 is radial, this making it possible to reduce the axial bulk of the rolling bearing. The additional expanse 36 of the outer race 1 may emanate from the latter and be machined, or on the contrary be attached, for example by welding.

The various elements are dimensioned in such a way that after the support 16 is set in place on the outer race, the housing 28 of the sensor is clasped elastically between the oblique surfaces 27 of the retaining element 25 and the bore 9b of the outer race, thus guaranteeing a strict gap between sensor and encoder.

The embodiments just described are not limiting. In particular, it is possible to envisage a rolling bearing equipped with several sensors together with a support provided with a corresponding number of recesses. It would thus be possible to determine the direction of rotation and/or the angular position of one race with respect to the other. The rolling bearing may also be envisaged with a rotating outer race and a non-rotating inner race. It is also possible to envisage a sensor whose housing has no chamfer.

By virtue of the invention, perfect radial positioning of the sensor with respect to a reference surface of the stationary race is obtained at low cost and the value of the gap between the sensor and the encoder is thus controlled.

What is claimed is:

1. Rolling bearing comprising a stationary race, a rotating race, at least one row of rolling elements placed between the stationary race and the rotating race, an encoder means secured to the rotating race and concentric therewith and a sensor assembly secured to the stationary race and comprising a sensor arranged facing and a small gap away from the encoder means the travel of which, during rotation, is detected by the sensor, in which rolling bearing the sensor has a housing, the sensor assembly further comprises a support which supports the sensor such that said housing bears directly on a reference surface of the stationary race.

2. Rolling bearing according to claim 1, wherein said support is dimensioned and arranged so as to exert, through elasticity, a radial outward load on said housing so as to maintain said housing continually bearing against the reference surface.

3. Rolling bearing accordingly to claim 1, wherein the stationary race is the outer race, the sensor assembly comprises a support and a sensor, the support being a compact element, which is elastically clasped to the outer race and comprises a main body and a retaining element, the main body essentially being arranged in the axial direction against a primary axial extension of the outer race, the primary axial extension having further secondary axial extension, which is essentially annular and has radial outward oriented surface and an opposing surface being oriented essentially in the same direction as the reference surface, which secondary axial extension is interrupted by a notch delimited by parallel edges forming a slideway for and partially embracing the retaining element and forming two grooves, the main body having two in the radial direction opposing portions projecting in the axial and azimuth direction over corresponding portions of the outward oriented surface of the secondary axial extension and the retaining element having a portion, which projects in the axial direction over a corresponding portion of the reference surface and which has a recess in which the sensor is arranged and pressed against the reference surface.

4. Rolling bearing according to claim 1, characterized in that, the sensor means comprising at least one sensor, each housing (28) comprising a reference face (29) in contact with the said reference surface, and a detection face (30) opposite the reference face and arranged facing the encoder means.

5. Rolling bearing according to claim 4, characterized in that the housing comprises two chamfer-forming oblique surfaces (31) linking up with each side of the detection face.

6. Rolling bearing according to claim 5, characterized in that the support is annular and provided with at least one recess (26) designed to accommodate a sensor, each recess comprising a notch whose edges (27) form surfaces for positioning the sensor with respect to the support.

7. Rolling bearing according to claim 6, characterized in that the edges of the recess are arranged converging towards the inside of the bearing, and in contact with the oblique surfaces of the housing.

8. Rolling bearing according to claim 7, characterized in that the support comprises at least one drilling (33) for connection pins of the sensor means.

9. Rolling bearing according to claim 6, characterized in that the support comprises at least one drilling (33) for connection pins of the sensor means.

10. Rolling bearing according to claim 5, characterized in that the support comprises at least one drilling (33) for connection pins of the sensor means.

11. Rolling bearing according to claim 4, characterized in that the support comprises at least one drilling (33) for connection pins of the sensor means.

12. Rolling bearing according to claim 4, characterized in that said stationary race includes an extension, and the support comprises an annular main body and an annular retaining element, the main body being in contact with the front end face of the extension and the retaining element being in contact with the bore of the said extension.

13. Rolling bearing according to claim 1, characterized in that the said support exerts a continuous load on the sensor means in the direction of the reference surface.

14. Rolling bearing according to claim 13, characterized in that said stationary race includes an extension, and the support comprises an annular main body and an annular retaining element, the main body being in contact with the front end face of the extension and the retaining element being in contact with the bore of the said extension.

15. Rolling bearing according to claim 13, characterized in that the sensor comprises at least one magnetosensitive or optical sensor (14) and the encoder means comprises a multipole magnetized ring.

16. Rolling bearing according to claim 13, characterized in that, the sensor housing has a reference face (29) in contact with the said reference surface, an a detection face (30) opposite the reference face and arranged facing the encoder means.

17. Rolling bearing according to claim 1, characterized in that the sensor means comprises at least one magnetosensitive or optical sensor (14) and the encoder means comprises a multipole magnetized ring.

18. Rolling bearing according to claim 13, characterized in that, the sensor (14) housing has a reference face (29) in contact with the said reference surface, an a detection face (30) opposite the reference face and arranged facing the encoder means.

19. Rolling bearing according to claim 17, characterized in that said stationary race includes an extension, and the support comprises an annular main body and an annular retaining element, the main body being in contact with the front end face of the extension and the retaining element being in contact with the bore of the said extension.

20. Rolling bearing according to claim 1, characterized in that the stationary race includes an extension with a bore, said support comprising an annular main body and an annular retaining element, the main body being in contact with the front end face of the extension and the retaining element being in contact with the bore of the said extension.

21. Rolling bearing according to claim 1 wherein the sensor is located radially between the stationary outer race and the support.

22. Rolling bearing according to claim 1, characterized in that the housing has a reference face which projects radially with respect to the periphery of the support.

23. Rolling bearing according to claim 1, characterized in that the support is provided with two axial grooves (35) capable of co-operating with complementary surfaces of the stationary race.

24. Rolling bearing comprising a stationary race, a rotating race, at least one row of rolling elements placed between the stationary race and the rotating race, an encoder means secured to the rotating race and concentric therewith and a sensor assembly provided with a support secured to the stationary race and comprising a sensor arranged facing and a small gap away from the encoder means the travel of which, during rotation, is detected by the sensor, in which rolling bearing the sensor has a housing, the sensor assembly further comprises a support which supports the sensor and exerts an elastic radial load on the housing such that said housing bears directly on a reference surface of the stationary race.

25. Rolling bearing according to claim 24, characterized in that the said support exerts a continuous load on the sensor means in the direction of the reference surface.

26. Rolling bearing according to claim 25, characterized in that said stationary race includes an extension, and the support comprises an annular main body and an annular retaining element, the main body being in contact with the front end face of the extension and the retaining element being in contact with the bore of the said extension.

27. Rolling bearing according to claim 25, characterized in that the sensor comprises at least one magnetosensitive or optical sensor and the encoder means comprises a multiple magnetized ring.

28. Rolling bearing according to claim 25, characterized in that, the sensor provided with a housing has a reference face in contact with the said reference surface, and a detection face opposite the reference face and arranged facing the encoder means.

29. Rolling bearing according to claim 24, characterized in that the sensor means comprises at least one magneto-sensitive or optical sensor and the encoder means comprises a multipole magnetized ring.

30. Rolling bearing according to claim 29, characterized in that, the sensor housing has a reference face in contact with the said reference surface, and a detection face opposite the reference face and arranged facing the encoder means.

31. Rolling bearing according to claim 29, characterized in that said stationary race includes an extension, and the support comprises an annular main body and an annular retaining element, the main body being in contact with the front end face of the extension and the retaining element being in contact with the bore of the said extension.

32. Rolling bearing according to claim 24, characterized in that the stationary race includes an extension with a bore, said support comprising an annular main body and an annular retaining element, the main body being in contact with the front end face of the extension and the retaining element being in contact with the bore of the said extension.

33. Rolling bearing according to claim 24, characterized in that the housing has a reference face which projects radially with respect to the periphery of the support.

34. Rolling bearing according to claim 24, characterized in that the support is provided with two axial grooves capable of co-operating with complementary surfaces of the stationary race.

35. Rolling bearing according to claim 24, characterized in that, the sensor means comprising at least one sensor, each housing comprising a reference face in contact with the said reference surface and a detection face opposite the reference face and arranged facing the encoder means.

36. Rolling bearing according to claim 35, characterized in that the housing comprises two chamfer-forming oblique surfaces lining up with each side of the detection face.

37. Rolling bearing according to claim 36, characterized in that the support is annular and provided with at least one recess designed to accommodate a sensor, each recess comprising a notch whose edges form surfaces for positioning the sensor with respect to the support.

38. Rolling bearing according to claim 37, characterized in that the edges of the recess are arranged converging towards the inside of the bearing, and in contact with the oblique surfaces of the housing.

39. Rolling bearing according to claim 38, characterized in that the support comprises at least one drilling for connection pins of the sensor means.

40. Rolling bearing according to claim 37, characterized in that the support comprises at least one drilling for connection pins of the sensor means.

41. Rolling bearing according to claim 36, characterized in that the support comprises at least one drilling for connection pins of the sensor means.

42. Rolling bearing according to claim 35, characterized in that the support comprises at least one drilling for connection pins of the sensor means.

43. Rolling bearing according to claim 35, characterized in that said stationary race includes an extension, and the support comprises an annular main body and an annular retaining element, the main body being in contact with the front end face of the extension and the retaining element being in contact with the bore of the said extension.

44. Rolling bearing according to claim 24, wherein the sensor is located radially between the stationary outer race and the support.

45. Rolling bearing according to claim 24, wherein the stationary race is the outer race, the sensor assembly comprises a support and a sensor, the support being a compact element, which is elastically clasped to the outer race and comprises a main body and a retaining element, the main body essentially being arranged in the axial direction against a primary axial extension of the outer race, the primary axial extension having further secondary axial extension, which is essentially annular and has radial outward oriented surface and an opposing surface being oriented essentially in the same direction as the reference surface, which secondary axial extension is interrupted by a notch delimited by parallel edges forming a slideway for and partially embracing the retaining element and forming two grooves, the main body having two in the redial direction opposing portions projecting in the axial and azimuth direction over corresponding portions of the outward oriented surface of the secondary axial extension and the retaining element having a portion, which projects in the axial direction over a corresponding portion of the reference surface and which has a recess in which the sensor is arranged and pressed against the reference surface.

46. Rolling bearing according to claim 24, wherein the support is formed of a material exhibiting a degree of flexibility such that said support exhibits a radial outward load on said housing so as to maintain said housing continuously pushed out against said reference surface.

47. Rolling bearing comprising a stationary race having a reference surface, a rotating race, at least one row of rolling elements placed between the stationary race and the rotating race, an encoder means secured to the rotating race and concentric therewith, a sensor assembly which includes a support and a sensor which is supported by the support, said support being secured to the stationary race, said sensor facing and a small gap away from the encoder means the travel of which, during rotation, is detected by sensor, said sensor including a housing having a reference face which is in contact with and bears directly against said reference surface of the stationary race, said support having a connection outlet.

* * * * *